(12) United States Patent
Zinke

(10) Patent No.: US 10,513,141 B2
(45) Date of Patent: Dec. 24, 2019

(54) MULTILAYER DATA STORAGE DEVICE HAVING A FLAT SEE-THROUGH WINDOW

(71) Applicant: Veridos Gmbh, Berlin (DE)

(72) Inventor: Andreas Zinke, Gräfelfing (DE)

(73) Assignee: VERIDOS GMBH, Berlin (DE)

( * ) Notice: Subject to any disclaimer, the term of this patent is extended or adjusted under 35 U.S.C. 154(b) by 0 days.

(21) Appl. No.: 15/749,779

(22) PCT Filed: Aug. 18, 2016

(86) PCT No.: PCT/EP2016/001408
§ 371 (c)(1),
(2) Date: Feb. 2, 2018

(87) PCT Pub. No.: WO2017/032450
PCT Pub. Date: Mar. 2, 2017

(65) Prior Publication Data
US 2019/0001733 A1 Jan. 3, 2019

(30) Foreign Application Priority Data
Aug. 21, 2015 (DE) .......................... 10 2015 010 811

(51) Int. Cl.
*B42D 25/351* (2014.01)
*B42D 25/45* (2014.01)
(Continued)

(52) U.S. Cl.
CPC ........... *B42D 25/351* (2014.10); *B42D 25/23* (2014.10); *B42D 25/324* (2014.10); *B42D 25/41* (2014.10);
(Continued)

(58) Field of Classification Search
CPC .... B42D 25/351; B42D 25/45; B42D 25/455; B42D 25/46; B42D 2035/36
See application file for complete search history.

(56) References Cited

U.S. PATENT DOCUMENTS 4,765,656 A 8/1988 Becker et al.
4,766,026 A 8/1988 Lass et al.
(Continued)

FOREIGN PATENT DOCUMENTS

AU 2015 100 575 A4 5/2015
DE 10 2007 052 950 B3 5/2009
(Continued)

OTHER PUBLICATIONS

English translation of DE102007016779B4.
(Continued)

*Primary Examiner* — Kyle R Grabowski
(74) *Attorney, Agent, or Firm* — Frank Rosenberg

(57) ABSTRACT

The present invention relates to a multilayer data carrier (40) having an areal see-through window (42), having an opaque core layer (20) that is provided in a sub-region with an areal gap (22) to form the see-through window (42), and two cover foils (24, 26) that are transparent at least in the region of the see-through window (42) and that are laminated onto opposing sides of the opaque core layer (20). Here, according to the present invention, it is provided that the two cover foils (24, 26) are joined with each other across the entire area of the see-through window (42) and that the cover foils (24, 26) that are joined with each other are provided in the see-through window (42) with an embossed relief pattern (44), the embossed relief pattern (44) producing in the see-through window (42) a latent image that, due to light diffraction, comes into view when looked through.

10 Claims, 2 Drawing Sheets

Figure 1:
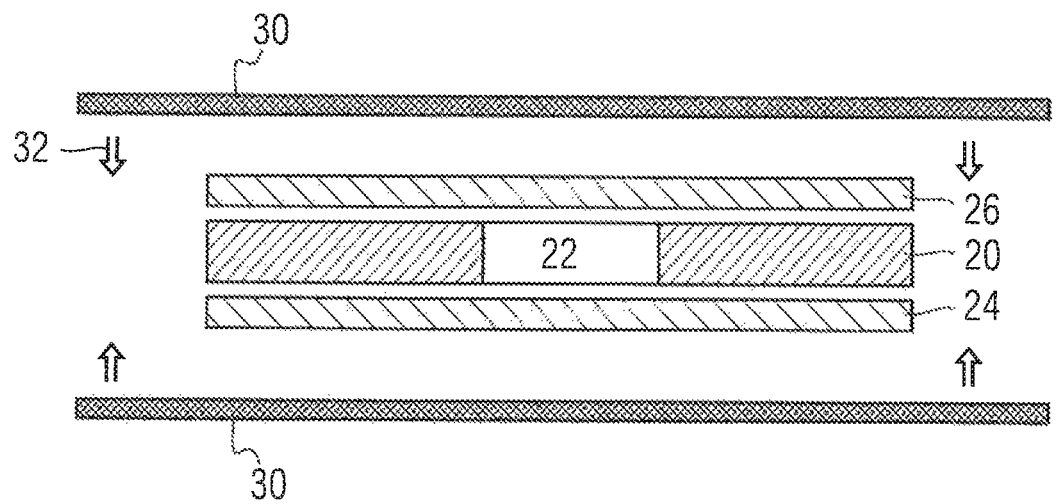

(51) Int. Cl.
  *B42D 25/455* (2014.01)
  *B42D 25/46* (2014.01)
  *B42D 25/41* (2014.01)
  *B42D 25/425* (2014.01)
  *B42D 25/324* (2014.01)
  *B42D 25/23* (2014.01)
  *G06K 19/06* (2006.01)
  *B42D 25/24* (2014.01)

(52) U.S. Cl.
  CPC ......... *B42D 25/425* (2014.10); *B42D 25/455* (2014.10); *B42D 25/46* (2014.10); *G06K 19/06196* (2013.01); *B42D 25/24* (2014.10)

(56) References Cited

U.S. PATENT DOCUMENTS

| | | | | |
|---|---|---|---|---|
| 6,749,925 B2* | 6/2004 | Hoppe | ............ | B42D 25/00 283/72 |
| 7,654,581 B2 | 2/2010 | Cruikshank et al. | | |
| 8,603,615 B2 | 12/2013 | Keller | | |
| 2006/0127649 A1* | 6/2006 | Keller | ............ | B42D 25/47 428/195.1 |
| 2006/0151989 A1* | 7/2006 | Muke | ............ | B42D 25/00 283/67 |
| 2006/0197337 A1* | 9/2006 | Merry | ............ | B42D 25/435 283/109 |
| 2008/0036197 A1* | 2/2008 | Brehm | ............ | B42D 25/29 283/113 |
| 2010/0196587 A1 | 8/2010 | Keller | | |
| 2018/0147881 A1* | 5/2018 | Endres | ............ | B42D 25/351 |

FOREIGN PATENT DOCUMENTS

| | | |
|---|---|---|
| DE | 10 2012 211 077 A1 | 1/2014 |
| DE | 10 2007 016 779 B4 | 3/2015 |
| GB | 2543054 A * 4/2017 | ........... B42D 25/455 |
| WO | 2011/061203 A1 | 5/2011 |

OTHER PUBLICATIONS

English translation of DE102007052950B3.
English translation of DE2012211077A1.
English translation of WO2011061203A1.
English translation Search Report from DE1020150108115 dated Jul. 18, 2016.
English translation of the International Search Report dated Mar. 2, 2017 from PCT/EP2016/001408.
English translation of the Written Opinion dated Jan. 4, 2018 from PCT/EP2016/001408.
English translation of the International Preliminary Report on Palatability dated Feb. 27, 2018 from PCT/EP2016/001408.

* cited by examiner

MULTILAYER DATA STORAGE DEVICE HAVING A FLAT SEE-THROUGH WINDOW

RELATED APPLICATIONS

This application is a national stage filing and claims the priority benefit of PCT/EP2016/001408 filed 18 Aug. 2016 and also claims priority to German Patent Application No. 10 2015 010 811.5, filed Aug. 21, 2015.

The present invention relates to a multilayer data carrier having an areal see-through window, and a method for manufacturing such a data carrier.

For protection, data carriers such as value or identification documents are often provided with security elements that permit the authenticity of the data carrier to be verified and that simultaneously serve as protection against unauthorized reproduction. Here, see-through security features, such as see-through windows in identification cards and other identification documents, are becoming increasingly attractive.

As described, for example, in the document EP 1 719 637 A2, in manufacturing identification cards having see-through windows, an opaque core layer is normally provided with an areal gap in the shape of the desired window and the uncovered core layer is laminated together with two transparent cover foils. Upon lamination, the material of the cover foils softens, flows into the gap in the core layer and, in this way, ideally produces a card structure having a smooth surface and a see-through window in the region of the gap. It has been shown, however, that above a certain window size, lamination marks often occur in the center of the see-through window that strongly detracted from the visual appearance of the window. Due to said lamination marks, the maximum size of transparent windows is, in practice, severely limited.

Proceeding from this, it is the object of the present invention to avoid the disadvantages of the background art and especially to create a data carrier of the kind mentioned above having large-area see-through windows of high optical quality. The present invention is also intended to provide a method for manufacturing such a data carrier.

This object is solved by the features of the independent claims. Developments of the present invention are the subject of the dependent claims.

According to the present invention, a multilayer data carrier having an areal see-through window includes an opaque core layer that is provided in a sub-region with an areal gap to form the see-through window, and two cover foils that are transparent at least in the region of the see-through window and that are laminated onto opposing sides of the opaque core layer. Here, according to the present invention, it is provided that the two cover foils are joined with each other across the entire area of the see-through window and that the cover foils that are joined with each other are provided in the see-through window with an embossed relief pattern, the embossed relief pattern producing in the see-through window a latent image that, due to light diffraction, comes into view when looked through.

As explained in greater detail below, by embossing a suitable relief pattern in the see-through window upon lamination, the creation of a true composite material composed of the opposing cover foils in the entire surface region of the see-through window is significantly promoted and the creation of lamination marks thus effectively suppressed.

The see-through window in the data carrier is advantageously developed to have a large area, especially having an area of more than 1 cm$^2$, preferably of more than 2 cm$^2$, and/or to have a smallest dimension of more than 0.5 cm, preferably of more than 1 cm.

The embossed relief pattern constitutes an additional security feature in the see-through window of the data carrier that can be used for the visual and/or machine authenticity check. In particular, the embossed relief pattern produces in the see-through window a latent image that, due to light diffraction, comes into view when looked through. In reflected light, in contrast, the latent image of the see-through window is advantageously substantially non-visible. The embossed relief pattern advantageously forms a motif, especially a geometric pattern, a three-dimensional motif or a microtext.

In one advantageous development of the present invention, the see-through window further includes a marking produced by the action of laser radiation. Here, the embossed relief pattern and the laser-produced marking are preferably associated in meaning, it especially being able to be provided that the embossed relief pattern and the laser-produced marking each constitute pieces of information that are related to or that complement each other.

The data carrier advantageously constitutes an identification card, especially an identity card, a data page for an identification document, a bank card, a credit card or a driver's license.

The present invention also includes a method for manufacturing a multilayer data carrier having an areal see-through window, in which an opaque core layer is provided and, to form the see-through window, is provided in a sub-region with an areal gap, two cover foils are provided that are transparent at least in the region of the see-through window to be produced, and a layer sequence composed of a first cover foil, an opaque core layer and a second cover foil are laminated together with the aid of opposing lamination plates, such that the areal gap in the core layer, together with the transparent regions of the cover foils, forms the see-through window.

Here, according to the present invention, it is provided that at least one of the lamination plates comprises, in the region of the see-through window, a relief pattern that is elevated in at least some regions, and whose form, upon lamination, is transferred in the inverse form to the adjacent cover foil, and whose elevations, upon lamination, produce an additional contact pressure in the interior of the areal gap in the core layer.

Advantageously, the transferred relief pattern produces here in the see-through window a latent image that, due to light diffraction, comes into view when looked through.

In one development of the present invention, a marking in the see-through window is produced due to the influence of laser radiation. Here, the relief pattern produced in the see-through window and the laser-produced marking are preferably developed in such a way that they are associated in meaning, especially constituting pieces of information that are related to or that complement each other.

Further exemplary embodiments and advantages of the present invention are explained below by reference to the drawings, in which a depiction to scale and proportion was dispensed with in order to improve their clarity.

Figure 2:
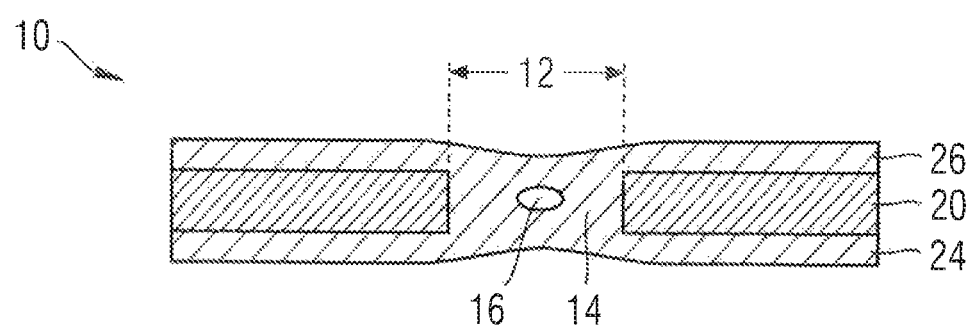
Figure 3:
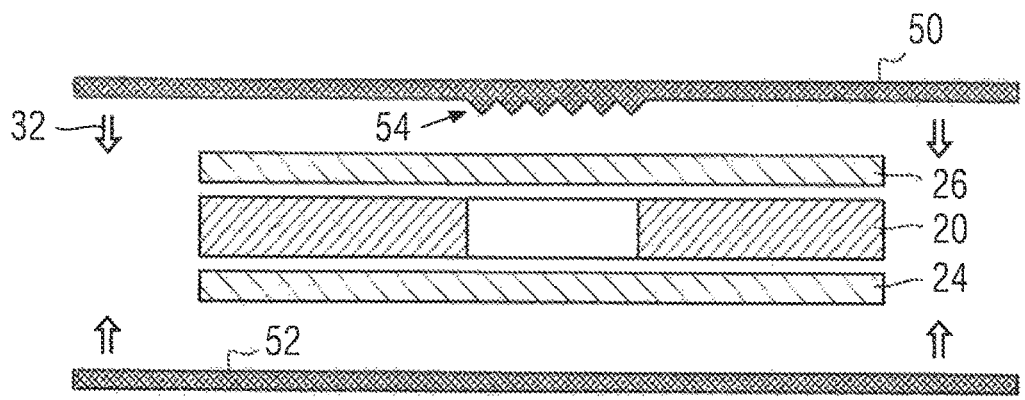
Figure 4:
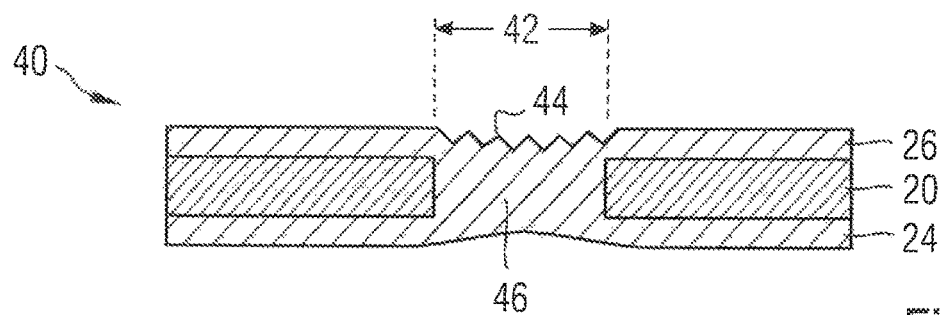
Figure 5:
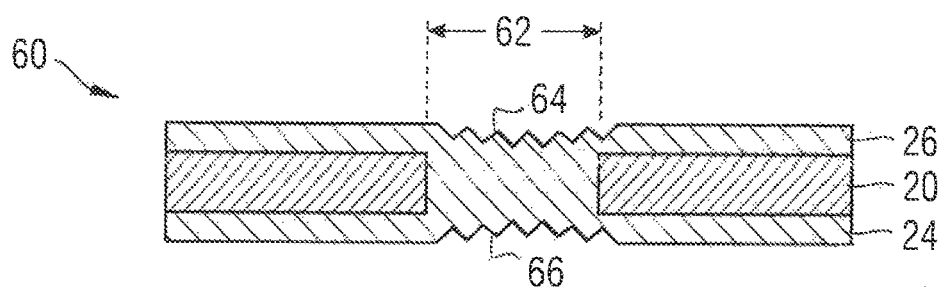
Figure 6:
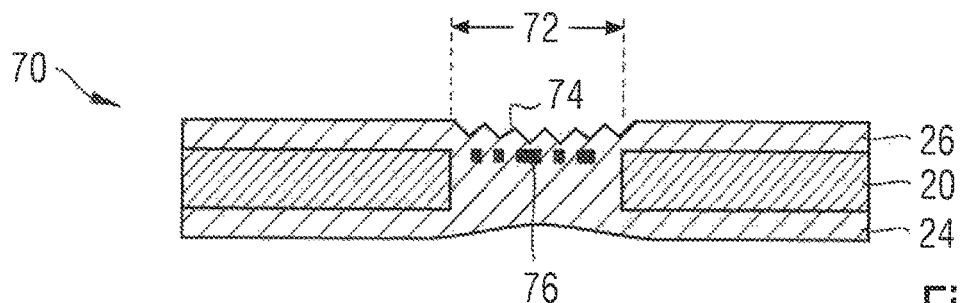

Shown are:

FIG. 1 schematically, the manufacture of a data page having a see-through window according to a method in the background art, FIG. 2 a data page manufactured with the conventional method in FIG. 1 and having a lamination mark in the center of the window, FIG. 3 schematically, the manufacture of a data page having a see-through window according to an inventive method, FIG. 4 manufactured with the method of FIG. 3, a data page according to an exemplary embodiment of the present invention, FIG. 5 a data page having opposing embossed relief patterns in the see-through window according to another exemplary embodiment of the present invention, and FIG. 6 a data page having an additional laser-produced marking according to a further exemplary embodiment of the present invention.

The present invention will now be explained using the example of cards having see-through windows, for example a data page for a passport. For a better understanding of the present invention, first, with reference to FIGS. 1 and 2, a conventional method for manufacturing a data page 10 having a see-through window 12 and the problems that often occur here are outlined.

In the conventional method, a temperature-stable opaque core layer 20 is provided and, in a sub-region, provided with an areal gap 22 in the shape of the desired see-through window 12. Further, two cover foils 24, 26 are provided that are transparent at least in the region of the subsequent see-through window 12. The first cover foil 24, the core layer 20 and the second cover foil 26 are laid one on top of the other (for the sake of clarity, FIG. 1 shows the layers having a small separation) and, with the aid of two opposing lamination plates 30, laminated together under the influence of pressure 32 and temperature.

Upon lamination, the material of the cover foils 24, 26 softens, flows into the areal gap 22 in the core layer 20 and fills said gap, such that a card structure having a smooth surface and a see-through window 12 in the region of the gap 22 is created.

In practice, however, it has been shown that said method delivers satisfactory results only for small see-through windows. For larger-area see-through windows, in contrast, particularly in the center region of the see-through window, distracting marks are often observed that, according to current understanding, can be attributed to an incomplete lamination of the cover foil material that coalesces in the window region 14 and the inclusion of air bubbles 16 in the window region. According to said understanding, particularly in the center region of large-area windows, the coalescing materials of the cover foil then only lie next to each other and are not joined with each other.

The inventive method described with reference to FIGS. 3 and 4 for manufacturing a data page 40 having a see-through window 42 provides effective relief here.

In the method according to the present invention, a temperature stable opaque core layer 20 is provided and, in a sub-region, provided with an areal gap 22 in the shape of the desired see-through window 42. For this, the gap 22 can, for example, be punched out of the core layer. Since, due to the inventive approach, no distracting lamination marks occur, as explained below, the area of the gap 22 can be chosen practically arbitrarily, especially also to have a large area.

In addition to the core layer 20, two cover foils 24, 26 are provided that are transparent at least in the region of the subsequent see-through window 42. The first cover foil 24, the core layer 20 and the second cover foil 26 are laid one on top of the other (for the sake of clarity, FIG. 3 shows the layers having a small separation) and, with the aid of two opposing lamination plates 50, 52, laminated together under the influence of pressure 32 and temperature.

Here, at least one of the lamination plates 50 is provided, in the region of the see-through window 42 to be produced, on the side facing the layers to be laminated, with a relief pattern 54 that, at least in sub-regions, rises above the height level of the area of the lamination plate 50 that lies outside the relief pattern 54. Here, the terms elevation and depression refer, independently of the orientation of the lamination plate in space, to the surface of the lamination plate 50 facing the layers to be laminated. A pattern protruding from the surface is referred to as an elevation, and a receding pattern as a depression.

The relief pattern 54 can comprise both elevations and depressions, it is only important that elevations, that is, protruding patterns, are present at least in a sub-region of the relief pattern 54.

Here, the elevations and, if appropriate, also depressions in the relief pattern are arranged in the form of a desired motif, in the exemplary embodiment for instance in the form of a microtext.

Upon lamination, the relief pattern 54 in the lamination plate 50 now effects two things. First, upon lamination, the elevations in the relief pattern 54 produce an additional contact pressure in the interior of the areal gap 22 in the core layer 20. When the softened cover foil material coalesces, this additional contact pressure significantly supports the joining of the materials especially in the center of the window region 46 and, in this way, effectively prevents the inclusion of air bubbles, and thus the creation of distracting lamination marks, also in large-area windows.

Second, upon lamination, the relief pattern 54 is transferred in the inverse form to the adjacent cover foil 26, such that an embossed relief pattern 44 is created there that, in the exemplary embodiment, forms, for instance, a microtext. In this way, there is created in the see-through window 42 an additional security feature that further increases the counterfeit security of the data page 40.

The embossed relief pattern 44 forms, in the see-through window 42, a latent image that, similar to a watermark, is practically non-visible in top view and, due to light diffraction, comes into view only when looked through.

FIG. 5 shows, as a further exemplary embodiment, a data page 60 having a see-through window 62. Upon manufacturing the data page 60, in the lamination step, lamination plates having a relief pattern that is elevated in at least some regions were used on both sides, such that the see-through window 62 was provided on both sides with, in each case, an embossed relief pattern 64, 66. The opposing relief patterns 64, 66 can be identical or different and complement each other, for example, to form a complete motif when looked through from a certain viewing angle. Since the images of the relief patterns 64, 66 are created in different planes, also a particularly strong three-dimensional impression can be produced. In the case of identical relief patterns 64, 66, the congruence of the relief pattern motifs when looked through from a certain viewing direction can be used as a further authenticating feature.

The embossed relief pattern of the see-through window can be combined with further authenticating features, such as a laser personalization. For this, the exemplary embodiment in FIG. 6 shows a data page 70 of a passport having a see-through window 72 in which, upon lamination, a relief pattern 74 was embossed in the manner described above. In addition, the see-through window 72 includes a marking 76 that, due to the influence of laser radiation, was inscribed in the cover foil material that coalesced in the window region. The marking 76 advantageously displays personal data and constitutes, for example, a photo of the passport holder.

The laser-produced marking 76 and the embossed relief pattern 74 can be coordinated with each other in such a way that, when viewed in transmitted light, in combination, they produce a certain pattern that can be visually or machine-checked. Due to the different manufacturing routes, such security elements of different types that are related to or that complement each other are very difficult to imitate. In this way, the embossed relief pattern 74 produces an additional protection of the laser-produced marking 76 of the see-through window 72.

LIST OF REFERENCE SIGNS

10 Data page
12 See-through window
14 Window region
16 Air bubbles
20 Opaque core layer
22 Areal gap
24, 26 Cover foils
30 Lamination plates
32 Influence of pressure
40 Data page
44 Embossed relief pattern
42 See-through window
46 Window region
50, 52 Lamination plates
54 Relief pattern
60 Data page
62 See-through window
64, 66 Relief patterns
70 Data page
72 See-through window
74 Relief pattern
76 Laser-produced marking

The invention claimed is:

1. A multilayer data carrier having an areal see-through window, comprising:
   an opaque core layer that is provided in a sub-region with an areal gap to form the see-through window, and
   two cover foils, wherein each cover foil constitutes a single layer or a single material and that are transparent at least in the region of the see-through window and that are laminated onto opposing sides of the opaque core layer wherein the two cover foils coalesce with each other across the entire areal gap,
   characterized in that
   the data carrier is an identification card or a data page for an identification document
   the two cover foils are joined with each other across the entire area of the see-through window by laminating the cover foils with the aid of opposing lamination plates, and
   the cover foils that are joined with each other are provided in the see-through window with an embossed relief pattern, which is produced by a relief pattern in at least one lamination plates, which is elevated in at least some regions, and the embossed relief pattern producing in the see-through window a latent image that, due to light diffraction, comes into view when looked through, and that is substantially non-visible in reflected light.

2. The data carrier according to claim 1, characterized in that the see-through window is developed to have a large area having an area of more than 1 cm$^2$.

3. The data carrier according to claim 1, characterized in that the see-through window is developed to have a smallest dimension of more than 0.5 cm.

4. The data carrier according to claim 1, characterized in that the embossed relief pattern forms a geometric pattern, a three-dimensional motif or a microtext.

5. The data carrier according to claim 1, characterized in that the see-through window further includes a marking produced due to the influence of laser radiation.

6. The data carrier according to claim 5, characterized in that the embossed relief pattern and the laser-produced marking are associated in meaning.

7. The data carrier according to claim 6, characterized in that the embossed relief pattern and the laser-produced marking each constitute pieces of information that are related to or that complement each other.

8. A method for manufacturing a multilayer data carrier having an areal see-through window, in which
   an opaque core layer is provided and, to form the see-through window, is provided in a sub-region with an areal gap,
   a first cover foil and a second cover foil, wherein each cover foil constitutes a single layer or a single material are provided that are transparent at least in the region of the see-through window to be produced, and
   a layer sequence composed of the first cover foil, the opaque core layer and the second cover foil are laminated together with the aid of opposing lamination plates under the influence of temperature and pressure such that the two cover foils coalesce with each other across the entire areal gap such that the areal gap in the core layer, together with the transparent regions of the cover foils, forms the see-through window,
   characterized in that
   the data carrier is an identification card or a data page for an identification document,
   at least one of the lamination plates comprises, in the region of the see-through window, a relief pattern that is elevated in at least some regions, and whose form, upon lamination, is transferred in the inverse form to the adjacent cover foil, and whose elevations, upon lamination, produce an additional contact pressure in the interior of the areal gap in the core layer.

9. The method according to claim 8, characterized in that the transferred relief pattern produces in the see-through window a latent image that, due to light diffraction, comes into view when looked through.

10. The method according to claim 8, characterized in that a marking is produced in the see-through window due to the influence of laser radiation.

* * * * *